United States Patent [19]

Masuko et al.

[11] Patent Number: 5,166,271
[45] Date of Patent: Nov. 24, 1992

[54] HEAT RESISTANT POLYVINYL CHLORIDE COPOLYMER AND PREPARATION PROCESS OF THE COPOLYMER

[75] Inventors: Seiichi Masuko, Takaishi; Hideaki Takahara, Izumi; Akira Yamamoto, Tondabayashi, all of Japan

[73] Assignee: Mitsui Toatsu Chemicals, Inc., Tokyo, Japan

[21] Appl. No.: 401,833

[22] Filed: Sep. 1, 1989

[30] Foreign Application Priority Data

Sep. 12, 1988 [JP] Japan ................. 63-226478

[51] Int. Cl.$^5$ ................ C08F 259/04; C08F 2/18; C08K 5/13
[52] U.S. Cl. ................ 525/282; 525/260; 525/263; 525/308; 525/316; 525/317; 524/461; 524/706; 524/722; 524/739; 524/750
[58] Field of Search ............ 525/260, 263, 282, 308, 525/316, 317; 524/461, 706, 722, 739, 750

[56] References Cited

U.S. PATENT DOCUMENTS

| | | | |
|---|---|---|---|
| 3,549,725 | 12/1970 | Rose | 525/282 |
| 3,682,857 | 8/1972 | Harris | 525/282 |
| 4,762,882 | 8/1988 | Okano | 525/285 |

FOREIGN PATENT DOCUMENTS

| | | |
|---|---|---|
| 0053080 | 2/1982 | European Pat. Off. . |
| 1-210449 | 8/1989 | Japan . |
| 1015334 | 12/1965 | United Kingdom . |

OTHER PUBLICATIONS

Database Chemical Abstracts (Host: STN), 1989, No. 112(10); abstract no. 78266s, Columbus, Ohio, US.
European Search Report for Application No. EP 89 30 9001 dated Mar. 21, 1990.

*Primary Examiner*—Ana L. Carrillo
*Assistant Examiner*—Vasu S. Jagannathan
*Attorney, Agent, or Firm*—Sixbey, Friedman, Leedom & Ferguson

[57] ABSTRACT

A heat resistant polyvinyl chloride copolymer or a heat and impact resistant polyvinyl chloride copolymer is prepared by conducting graft copolymerization of N-substituted maleimide on a vinyl chloride resin or a rubber containing vinyl chloride resin.

The graft copolymerization reaction is carried out in the presence of a radical polymerizable monomer which is (1) liquid at the polymerization temperature, (2) capable of dissolving the N-substituted maleimide at the temperature, (3) 70° C. or more in glass transition temperature of the polymer thereof, and (4) used in an amount sufficient to dissolve the N-substituted maleimide.

22 Claims, 1 Drawing Sheet

FIG. I
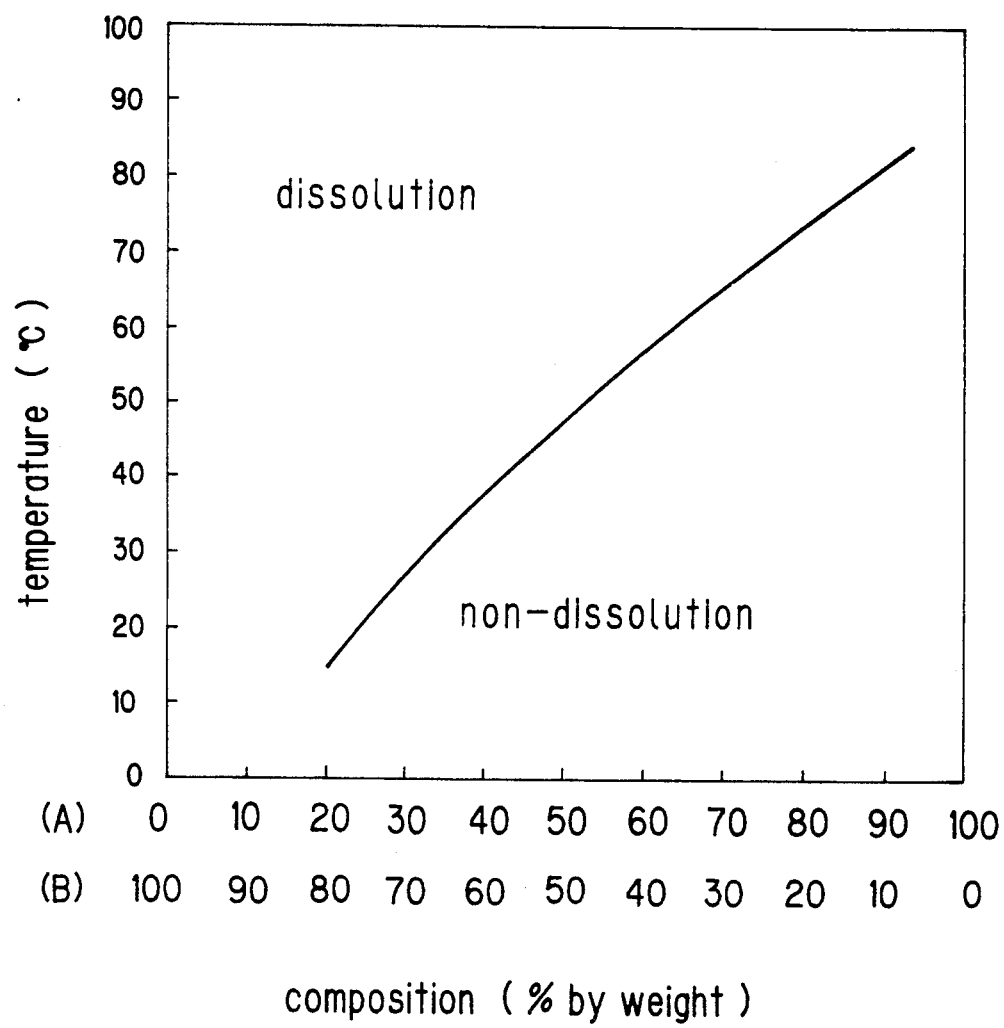
Dissolution of N-cyclohexylmaleimide in methylmethacrylate

HEAT RESISTANT POLYVINYL CHLORIDE COPOLYMER AND PREPARATION PROCESS OF THE COPOLYMER

BACKGROUND OF THE INVENTION

(1) Field of the Invention

The present invention relates to a heat resistant polyvinyl chloride copolymer, heat and impact resistant polyvinyl chloride copolymer and a process for the preparation of these copolymers. More particularly, it relates to a heat resistant polyvinyl chloride copolymer which is excellent in heat resistance, thermal stability and processability and can be used for films, sheets, corrugated sheetings, pipes, cable ducts, deck plates, building materials and industrial components. It further relates to a heat and impact resistant copolymer which has excellent impact resistance in addition to the heat resisting properties.

(2) Description of the Prior Art

Vinyl chloride resin has been widely used because rigid, semi-rigid and flexible products can be prepared by kneading the resin with a heat stabilizer, light stabilizer, plasticizer, lubricant, filler and coloring material. Particularly for rigid products, heat resistance of molded articles has recently been required and hence vinyl chloride resin has been desired to improve heat resistance.

So-called post-chlorinated vinyl chloride resin obtained by further chlorinating common vinyl chloride resin has been known to date as a vinyl chloride resin having improved heat resistance. The post-chlorinated vinyl chloride resin, however, has inferior heat stability, is liable to discoloration and has disadvantages in terms of processability. Consequently, research for improvement of these resins has been continuing.

For example, BP 1,293,542 discloses a thermoplastic resin composition obtained by blending a vinyl chloride base polymer with a copolymer composed of N-substituted maleimide and methacrylate ester monomer containing 50% by weight or more of methyl methacrylate or with a copolymer composed of N-substituted maleimide and said monomer in combination with other copolymerizable monomers. The composition, however, is still unsatisfactory in heat resistance.

A resin obtained by copolymerizing vinyl chloride with N-cyclohexylmaleimide is known to have improved heat resistance. A method having specific preparation conditions for improving the heat resistance of this resin has been disclosed in Japanese Patent Laid-Open No. 236809/1987. In the disclosure, N-cyclohexylmaleimide is added by portions in copolymerizing with vinyl chloride. However, polyvinyl chloride copolymer obtained by the addition in portions is insufficient in thermal stability and impact resistance although heat resistance has been improved.

As set forth above, vinyl chloride resin can provide from flexible to rigid products when desired, is resistant to various chemicals and has good processability. However, further improvement in heat resistance, thermal stability and also impact resistance is required for the resin.

SUMMARY OF THE INVENTION

An object of this invention is to provide a polyvinyl chloride copolymer having excellent heat resistance and a polyvinyl chloride copolymer having excellent heat and impact resistance.

Another object of this invention is to provide a process for the preparation of the polyvinyl chloride copolymer having excellent heat resistance and the polyvinyl chloride copolymer having excellent heat and impact resistance.

Other aspects, objects, and the several advantages of the invention will become apparent to one skilled in the art from a reading of the following disclosure and claims.

In accordance with the forgoing objects, the present invention provide a heat resistant polyvinyl chloride copolymer, a heat and impact resistant copolymer and a preparation process of the copolymer comprising conducting the graft copolymerization of vinyl chloride resin with N-substituted maleimide in the presence of a radical polymerizable monomer which is liquid at said copolymerization temperature, dissolves N-substituted maleimide and has a glass transition temperature of the polymer of 70° C. or more, and using said monomer in an amount sufficient to dissolve N-substituted maleimide.

A preferred aspect of the heat resistant polyvinyl chloride copolymer and the heat and impact resistant polyvinyl chloride copolymer obtained by the process of this invention is, for example, a copolymer containing N-substituted maleimide in a ratio of 1 to 100 parts by weight per 100 parts by weight of the vinyl chloride resin and also containing a radical polymerizable monomer having a glass transition temperature of 70° C. or more of the polymer thereof in a ratio of 10 to 700 parts by weight per 100 parts by weight of said N-substituted maleimide.

Another preferred aspect of the heat and impact resistant polyvinyl chloride copolymer is a vinyl chloride resin obtained by the graft polymerization of vinyl chloride monomer on rubber and contains from 0.5 to 20% by weight of rubber.

A further preferred aspect is a preparation process for the heat resistant polyvinyl chloride copolymer and the heat and impact resistant polyvinyl chloride copolymer which comprises, in the grafting reaction of the vinyl chloride resin containing rubber for preparing the polyvinyl chloride copolymer of this invention, conducting the graft polymerization in an aqueous suspension in the presence of an antioxidant or using polyvinyl chloride resin containing an antioxidant as starting materials.

The heat resistant vinyl chloride resin of this invention is excellent in heat resistance, particularly in Vicat softening point, and vinyl chloride resin having excellent thermal stability and processability can also be provided. Furthermore, vinyl chloride resin having outstanding impact resistance in addition to the excellent properties mentioned above can be provided. Consequently, the present invention is industrially very useful.

BRIEF DESCRIPTION OF THE DRAWINGS

FIG. 1 is a graph illustrating the solubility of N-cyclohexylmaleimide in methyl methacrylate in this invention.

DETAILED DESCRIPTION OF THE INVENTION

The vinylchloride resin of this invention can be used for the backbone polymer of the heat resistant polyvinyl chloride copolymer and the heat and impact resistant copolymer. Exemplary resins suitable for use include, for example, a homopolymer of vinyl chloride; a copolymer of vinyl chloride with a copolymerizable monomer thereof, that is, a copolymer of vinyl chloride monomer with vinyl compounds such as α-olefins having 2 to 30 carbon atoms, acrylic acid or esters thereof, methacrylic acid or esters thereof, maleic acid or esters thereof, vinyl acetate, vinyl propionate and alkyl vinyl ether, and polyfunctional monomers such as diallyl phthalate or a mixture of these compounds and monomer; and a graft copolymer obtained by grafting vinyl chloride monomer on ethylene/acrylic-ester copolymers such as ethylene/ethyl-acrylate copolymer, ethylene/methacrylate-ester copolymers such as ethylene/methyl-methacrylate copolymer, ethylene/vinyl-acetate copolymer (EVA), chlorinated polyethylene, butyl rubber, crosslinked acrylic rubber, polyurethane, polybutadiene/styrene/methyl-methacrylate (MBS), polybutadiene/acrylonitrile/(α-methyl)styrene (ABS), styrene/butadiene copolymer, polystyrene, polymethyl methacrylate and mixtures thereof. These resins may be used singly or in combination.

Among these vinyl chloride resins, polyvinyl chloride homopolymer is particularly prefered for the heat resistant vinyl chloride resin. Particularly preferred vinyl chloride resins used for the heat and impact resistant vinyl chloride resin are graft copolymers obtained by grafting vinyl chloride monomer on ethylene/vinyl-acetate copolymer (EVA), chlorinated polyethylene, butyl rubber, crosslinked acrylic rubber, polyurethane, polybutadiene/styrene/methyl-methacrylate (MBS), polybutadiene/acrylonitrile/(α-methyl)styrene (ABS), styrene/butadiene copolymer and rubber which is a mixture of these polymers and copolymers.

In these cases, the amount of rubber contained in the graft copolymer is preferably 0.5 to 20% by weight, more preferably 1 to 15% by weight, and most preferably 2 to 10% by weight in view of the balance between heat resistance and impact resistance. Rubber content less than 0.5% by weight results in no improvement in impact resistance. Rubber content exceeding 20% by weight is also unfavorable because of lowered heat resistance.

Vinyl chloride resin for use in this invention may be prepared by suspension polymerization, bulk polymerization or emulsion polymerization. The resin may be a powder or slurry dispersed in a medium. Polymerization degree of uncrossinked vinyl chloride reisn is from 300 to 5000, and preferably from 400 to 3000. The polymerization degree of crosslinked vinyl chloride resin cannot be measured in some cases depending upon the amount of a crosslinking agent. The preferred resin is polymerized in the temperature range of 30° to 80° C. When the polymerization degree of uncrosslinked resin is less than 300, molded product of the resin becomes brittle. Polymerization degree exceeding 5000 is unfavorable due to decrease in processability. On the other hand, crosslinked vinyl chloride resin polymerized at temperature lower than 30° C. leads to inferior processability, and the resin obtained by polymerizing at temperature exceeding 80° C. is also unfavorable because molded products become brittle.

Exemplary N-substituted maleimides for use in this invention includes, for example, aliphatic maleimides such as N-methylmaleimide, N-ethylmaleimide, N-n-propylmaleimide, N-isopropylmaleimide, N-n-butylmaleimide, N-t-butylmaleimide, N-hexylmaleimide, and N-laurylmaleimide; alicyclic maleimides such as N-cyclohexylmaleimide, and N-bicyclo-(2,2,1)-heptyl-2-methylmaleimide; aromatic maleimides such as N-phenylmaleimide, N-(o, m or p)-hydroxyphenylmaleimide, N-(o, m or p)-methoxyphenylmaleimide, N-(o, m or p)-chlorophenylmaleimide, N-(o, m or p)-carboxyphenylmaleimide, N-(o, m or p)-nitrophenylmaleimide, N 9,10-ethano-9,10-dihydroanthracenemaleimide, N-triphenylmethylbenzylmaleimide, and N-(o, m or p)-methylphenylmaleimide.

These N-substituted maleimides can be used singly or in combination. Preferred N-substituted maleimides for use in the invention are N-t-butylmaleimide,N-cyclohexylmaleimide, N-phenylmaleimide and N-(o, m or p)-chlorophenylmaleimide.

In the practice of this invention, the amount of N-substituted maleimide used is preferably 1 to 100 parts by weight, more preferably 2 to 80 parts by weight, and most preferably 5 to 60 parts by weight per 100 parts by weight of vinyl chloride resin. An amount of N-substituted maleimide less than 1 part by weight cannot exhibit satisfactory effect on the improvement of heat resistance. On the other hand, an amount in excess of 100 parts by weight leads to inferior processability and is unsuitable for practical use.

The radical polymerizable monomer having a glass transition temperature of the polymer of 70° C. or more in this invention means a radical polymerizable monomer (hereinafter referred to as solvent monomer) which provides a polymer having a glass transition temperature of 70° C. or more by radical polymerization.

The solvent monomer for use in the present invention is a radical polymerizable monomer which:

(1) is liquid at the polymerization temperature of grafting N-substituted maleimide on the vinyl chloride resin, (2) dissolves N-substituted maleimide at the temperature, and (3) the polymer has a glass transition temperature of 70° C. or more.

Illustrative solvent monomers include, for example, methacrylate esters such as methyl methacrylate, isopropyl methacrylate, t-butyl methacrylate and phenyl methacrylate; styrenes such as styrene and α-methylstyrene; and unsaturated nitriles such as acrylonitrile and methacrylonitrile. These solvent monomers can be used singly or in combination.

Particularly preferred solvent monomers are methyl methacrylate, t-butyl methacrylate, phenyl methacrylate, styrene, α-methylstyrene, acrylonitrile and methacrylonitrile.

The solvent monomer can also be used in combination with other monomers having a glass transition temperature of the polymer of less than 70° C. In the case where the solvent monomer is used in combination, the composition of the solvent monomer mixture is determined so that the polymer of the mixture has a glass transition temperature of 70° C. or more in the following equation (1):

$$1/Tg = W_1/T_1 + W_2/T_2 + W_3/T_3 + \ldots \quad (1)$$

wherein Tg:
glass transition temperature of the polymer of the mixture (°K.)

$W_1, W_2, W_3 \ldots$ : portion by weight of a specific monomer in the polymer of the mixture.

$T_1, T_2, T_3 \ldots$ : glass transition temperature of homopolymer consisting of specific monomer (°K.)

In the practice of this invention, the solvent monomer used may be in an amount sufficient to dissolve N-substituted maleimide at the graft polymerization temperature.

The amount for use may be previously determined by conducting a dissolution test. For example, in the cases where N-cyclohexylmaleimide is used as N-substituted maleimide and methyl methacrylate is used as the solvent monomer, the solubility is illustrated in FIG. 1. When graft copolymerization is carried out at 80° C., methyl methacrylate may be used in an amount of 10 parts by weight or more per 90 parts by weight of N-substituted maleimide on the basis of FIG. 1.

In the practice of polymerization, the presence of vinyl chloride resin has an effect on the amount of the solvent monomer. The amount of the solvent monomer is substantially from 10 to 700 parts by weight, preferably from 40 to 700 parts by weight, and more preferably from 100 to 600 parts by weight per 100 parts by weight of N-substituted maleimide.

Amount of the solvent monomer less than 10 parts by weight cannot completely dissolve N-substituted maleimide and hence graft copolymerization cannot be sufficiently carried out. Amount of the solvent monomer exceeding 700 parts by weight is also unfavorable because improvement on heat resistance is not efficient.

The method for the graft polymerization of this invention includes, for example, radical polymerization and radiation polymerization. Radical polymerization is preferred.

The graft copolymer of this invention can be prepared by suspension polymerization, bulk polymerization, emulsion polymerization and solution polymerization. Suspension polymerization and bulk polymerization are advantageous from industrial and economical view points. Suspension polymerization is preferred in view of heat removal.

Radical initiators for use in the graft copolymerization of this invention are common initiators used for the polymerization of vinyl chloride. Exemplary radical initiators include, for example, percarbonates such as diisopropylperoxy dicarbonate, dioctylperoxy dicarbonate, dilaurylperoxy dicarbonate, dimyristylperoxy dicarbonate, dicetylperoxy dicarbonate, di-tert-butylperoxy dicarbonate, di(ethoxyethyl)peroxy dicarbonate, di(methoxyisopropyl)peroxy dicarbonate, di(3-methoxybutyl)peroxy dicarbonate, di(3-methoxy-3-methylbutyl)peroxy dicarbonate, di(butoxyethyl)peroxy dicarbonate, di(2-isopropoxyethyl)peroxy dicarbonate, dibenzylperoxy dicarbonate, dicyclohexylperoxy dicarbonate, and di-t-butyl-cyclohexylperoxy dicarbonate; peresters such as tert-butyl-peroxy neodecanate, amylperoxy neodecanate, tert-octylperoxy neodecanate, α-cumylperoxy neodecanate, tert-butylperoxy pivalate, amylperoxy pivalate, tert-octylperoxy pivalate, α-cumylperoxy pivalate, perhexyl oxalate, di-tert-butylperoxy oxalate, acetylcyclohexylsulfonyl peroxide, and 1,1,3,3-tetramethylbutylperoxyphenoxy acetate; diacyl peroxides such as lauroyl peroxide, diisobutyl peroxide, 2-ethylhexanoyl peroxiode, and 3,3,5-trimethylhexanoyl peroxide; azo compounds such as azobis-isobutyronitrile, 2,2'-azobis-2,4-dimethylvaleronitrile, and 2,2'-azobis-4-methoxy-2,4-dimethylvaleronitrile, water soluble peroxides such as potassium persulfate and ammonium persulfate; and water soluble azo compounds such as 2,2'-azobis(2-aminopropane) hydrochloride, and 2,2'-azobis(N,N'-dimethyleneisobutylamidin) hydrochloride. The radical initiators may be used in combination in order to obtain uniform rate of polymerization.

The radical initiator is preferably used in an amount of 0.005 to 20.0 parts by weight per 100 parts by weight of the sum of N-substituted maleimide and the solvent monomer.

The heat resistant polyvinyl chloride copolymer and the heat and impact resistant polyvinyl chloride copolymer of this invention are superior in heat resistance to the blend of vinyl chloride resin and copolymer of N-substituted maleimide/solvent monomer which are the constitutional ingredients of the copolymer of this invention.

The reason is not clear, but the following process is assumed to proceed. As a result of graft copolymerization of this invention, the heat resistant polyvinyl chloride copolymer and the heat and impact resistant polyvinyl chloride copolymer contain vinyl chloride resin (I), copolymer obtained by grafting N-substituted maleimide and solvent monomer on vinyl chloride resin (II), and copolymer of N-substituted maleimide/solvent monomer (III). II functions as a high molecular compatibilizer of I and III, and leads to a mixture of I, II and III in a micro-structure.

In actual viscoelasticity measurement, the heat resistant polyvinyl chloride copolymer of this invention exhibits completely or almost mixed peak patterns. On the other hand, blended product exhibits almost separated or slightly mixed peak patterns. On account of the difference in such property, the copolymer of this invention has excellent heat resistance and high thermal stability.

In the aqueous suspension polymerization, the weight ratio of the amount of the sum of vinyl chloride resin, N-substituted maleimide and solvent monomer to the amount of water is from 1:0.8 to 1:10, and preferably from 1:1 to 1:4.

When the proportion of water to the sum of vinyl chloride resin, N-substituted maleimide and solvent monomer is less than 0.8, the aqueous suspension increases its viscosty and tends to be difficult to stir. On the other hand, the proportion exceeding 10 decrease productivity and is industrially and economically unfavorable.

The suspending agent may be used in suspension polymerization if necessary. Illustrative examples of the suspending agent may be mentioned polyvinyl alcohols, cellulose derivatives, maleic-anhydride/styrene copolymer, maleic-anhydride/methyl-vinyl-ether copolymer, polyvinyl pyrrolidone and gelatin. These agents may be used singly or in combination. Emulsifiers may be added if necessary.

The amount of the suspending agent is less than 1.0 part by weight per 100 parts by weight of vinyl chloride resin and preferably from 0.02 to 1.0 part by weight.

Chain transfer agents for use in the conventional polymerization method of vinyl compounds may be employed for the graft polymerization of this invention if necessary.

Exemplary chain transfer agents suitable for use include, for example, chlorinated aliphatic hydrocarbons such as carbon tetrachloride, chloroform, methylene chloride, butyl chloride, methylchloroform, propylene chloride and trichloroethylene; aromatic hydrocarbons such as toluene, xylene, mesitylene, cumene, ethylbenzene, t-butylbenzene and chlorobenzene; aldehydes such as acetaldehyde, propionaldehyde, benzaldehyde and crotonaldehyde; aliphatic and cyclic ketones such as methyl ethyl ketone, acetone, diethyl ketone, methyl isobutyl ketone and cyclohexanone ethyl ketone, methyl isobutyl ketone and cyclohexanone ethyl ketone; cyclic ethers such as dioxane and tetrahydrofuran; aliphatic carboxylic acid alkyl esters such as methyl isobutyrate and ethyl acetate; aliphatic alcohols such as sec-butyl alcohol, n-butyl alcohol, isobutyl alcohol and t-butyl alcohol; aliphatic carboxylic acids such as acetic acid; and cyclic hydrocarbons such as methylcyclohexane.

Exemplary chain transfer agents suitable for use in this invention further include, for example, monoalkyl mercaptans such as methyl mercaptan, ethyl mercaptan, propyl mercaptan, n-and t-butyl mercaptan, hexyl mercaptan, n-and t-heptyl mercaptan, n-and t-octyl mercaptan, n-and t-decyl mercaptan, n-and t-dodecyl mercaptan, n-and t-tetradecyl mercaptan, n-and t-hexadecyl mercaptan, n-and t-pentacosyl mercaptan, n-and t-octacosyl mercaptan, n-and t-triconyl mercaptan and mono-, di-and tri-mercaptan containing a mixture of these mercaptans.

Illustrative examples of other effective monomercaptans are, for example, thioacetic acid, 1-mercapto-2-butanone, methyl mercaptoacetate, ethyl mercaptothioacetate, 1-mercapto-2-ethoxyethane, diethyl mercaptoethylphosphortrithioate, 2-mercaptoethylacetamide, dimethylaminomethylmercaptan, cysteamine, mercaptomethylthiopropane, monomercaptocyclohexane, benzyl mercaptan, cystein and mercaptoethanol.

Illustrative examples of dimercaptan chain transfer agents are ethanedithiol, 2,3-dimercaptopropanol and decane-1,10-dithiol.

Exemplary suitable polymercaptan chain transfer agents having three or more mercaptan groups in a molecule include, for example, pentaerythritol tetra (7-mercaptoheptanoate), glycerol tri(mercapto-acetate), pentaerythritol tri ($\beta$-mercaptopropionate), pentaerythritol tetra($\beta$-mercaptopropionate), cellulose tri($\alpha$-mercaptoacetate), 1,2,3-propanetrithiol, 1,2,3,4-neopentanetetrathiol, 1,2,3,4,5,6-mercaptopoly(ethyleneoxy)ethyl(sorbitol), 1,1,1-trimethylpropane tri($\alpha$-mercaptoacetate), dipentaerythritolhexane(3-mercaptopropionate), 1,2,3-tri($\alpha$-mercaptoacetyl)propane, thiopentaerythritol tetra($\alpha$-mercaptoaceate), 1,6,10-trimercaptocyclododecan, 1,2,3,4,5,6-hexamercapto-cyclohexane, N,N',N'',N'''-tetra(2-mercaptoethyl)pyromellitic amide, tri(2-mercaptoethyl)nitrilo triacetate, pentaerythritol tetra($\alpha$-mercaptoacetate), tri(p-mercaptoethylphenyl)methane, 2,2,7,7-tetrakis(mercaptomethyl)-4,5-dimercapto-octane, 5,5,5-tri(mercaptoethyl)phosphorotrithioate and xylitol penta($\beta$-mercaptopropionate).

Exemplary chain transfer agents of low molecular weight polymer having three or more mercapto groups in a molecule are, for example, homopolymers and copolymers of vinyl thiols such as polyvinyl thiol. Other polymer thiols such as glycerol/ethylene glycol polyether polymercaptan can also be used for a chain transfer agent in the process of this invention. These chain transfer agents may be used singly or in combination.

Amount of the chain transfer agent in the process of this invention is determined by the type of the specific chain transfer agent selected. The amount, however, is generally 10 parts by weight or less per 100 parts by weight of the sum of N-substituted maleimide and solvent monomer.

Chain transfer agents such as mercaptanes and particularly polymercaptans are generally most effective and may be used in a concentration around the lower limit of the above range. On the other hand, chain tranfer agents such as aromatic hydrocarbon base transfer agents having inferior effect are used in a concentration around the upper limit of the above range.

Compounds having swelling action to vinyl chloride resin, for example, ketones such as acetone and methyl ethyl ketone, may be used in order to increase grafting efficiency in a range giving no adverse effect on the object of this invention if necessary.

Antioxidents may be preferably added to the graft copolymers of this invention in order to enhance thermal stability.

Exemplary antioxidants suitable for use may be mentioned, for example, phenolic antioxidants such as 2,6-di-t-butyl-p-cresol(DBT), 3-t-butyl-4-hydroxyanisole(3-BHT), 2-t-butyl-4-hydroxyanisole(2-BHT), 2,2-methylenebis(4-methyl-6-t-butylphenol)(MBMBP), 2,2-methylenebis(4-ethyl-6-t-butylphenol)(MBEBP), 4,4'-butylidenebis(3-methyl-6-t-butylphenol)(SBMBP), styrenated phenol, styrenated-p-cresol, 1,1,3-tris(2-methyl-4-hydroxy-5-t-butylphenol)butane, tetrakis[methylene-3-(3,5-di-t-butyl-4-hydroxyphenol)propionate]methane, n-octadecyl-3-(4-hydroxy-3,5-di-t-butylphenyl)propionate, triethylene glycol bis[3-(3-t-butyl-5-methyl-4-hydroxy-phenyl)propionate], 1,3,5-trimethyl-2,4,6-tris(3,5-di-t-butyl-4-hydroxybenzyl)benzene, 2,2'-dihydroxy-3,3'-di($\alpha$-methylcyclohexyl)-5,5'-dimethyldiphenyl methane, 4,4-methylenebis(2,6-di-t-butylphenol), tris(3,5-di-t-butyl-4-hydroxyphenol), tris(3,5-di-t-butyl-4-hydroxyphenyl) isocyanurate, 1,3,5 tris(3',5'-di-t-butyl-4-hydroxybenzoyl) isocyanurate, bis[2-methyl-4-(3-n-alkylthiopropionyloxy)-5-t-butylphenyl]sulfide, 1-oxy-3-methylisopropylbenzene, 2,5-dibutylhydroquinone, 2,2'-methylenebis(4-methyl-6-nonylphenol), alkylated bisphenol, 2,5-di-t-amylhydroquinone, polybutylated bisphenol-A, bisphenol-A, 2,6-di-t-butyl-p-ethylphenol, 2,6-bis(2'-hydroxy-3-t-butyl-5'-methylbenzyl)-4-methylpenol, 1,3,5-tris(4-t-butyl-3-hydroxy-2,6-dimethylbenzyl)isocyanurate, terephthaloyl-di(2,6-dimethyl-4-t-butyl-3-hydroxybenzyl sulfide), 2,6-di-t-butylphenol, 2,6-di-t-butyl-2-dimethylamino-p-cresol, 2,2'-methylenebis(4-methyl-6-cyclohexylphenol), hexamethylene glycol bis(3,5-t-butyl-4-hydroxyphenyl) propionate, (4-hydroxy-3,5-di-t-butylanilino)-2,6-bis(octylthio)-1,3,5-triazine, 2,2-thio[diethyl-bis-3-(3,5-di-t-butyl-4-hydroxyphenyl)propionate], N,N'-hexamethylene(3,5-di-t-butyl-4-hydroxycinnamide), 3,5-di-t-butyl-4-hydroxybenzylphosphoric acid diethyl ester, 2,4-dimethyl-6-t-butylphenol, 4,4'-methylenebis(2,6-di-t-butylphenol), 4,4'-thiobis(2-methyl-6-t-butylphenol), tris[2-(3,5-di-t-butyl-4-hydroxyphenyl)propionyloxyethyl]isocyanurate, 2,4,6-tributylphenol, bis[3,3-bis(4'-hydroxy-3'-t-butylphenyl)butyric acid]glycol ester, 4-hydroxymethyl-2,6-di-t-butylphenol, and bis(3-methyl-4-hydroxy-5-t-butylbenzyl) sulfide; amine antioxidants such as N-phenyl-N'-isopropyl-p-phenylenediamine, N-phenyl N'-(1,3-dimethylbutyl)-p-phenylenediamine, N,N'-diphenyl-p-phenylenediamine, 2,2,4-trimethyl-1,2-dihydroquinoline polymer and diaryl-p-phenylenediamine; sulfur containing antioxidant such as dilauryl thiodipropionate, distearyl thiodipropionate and 2-mercaptobenzimidazol; and phosphorus containing anti-oxidants such as distearylpentaerythritol diphosphite. Antioxidants other than those set forth above can also be used for this invention. The antioxidants can be used singly or in combination.

The antioxidants may be added to the graft-polymerized copolymer. However, the antioxidants are more preferably contained in the vinyl chloride resin to be used for the raw material or added in the graft polymerization step, which method markedly improves the thermal stability of the resulting copolymer. The antioxidants may be added before or during polymerization.

Amount of the antioxidants contained in the vinyl chloride resin to be used for graft copolymerization or added in the step of graft polymerization is in the range of preferably from 5 to 500 ppm by weight, more preferably from 5 to 200 ppm by weight, and most preferably from 5 to 100 ppm by weight.

When the amount of the antioxidant contained in the vinyl chloride resin or added in the graft polymerization step is less than 5 ppm by weight, thermal stability of the grafted copolymer is unsatisfactory. On the other hand, an amount exceeding 500 ppm by weight inhibits completion of the polymerization reaction or requires a large amount of the radical initiator, which situation unfavorably causes adverse effect on the thermal stability of the resulting graft copolymer.

Temperature of graft copolymerization is preferably from 30° to 100° C. and more preferably from 40° to 100° C. A reaction temperature lower than 30° C. serves to slow down the rate of graft polymerization and is hence industrially and economically unfavorable. On the other hand, a reaction temperature above 100° C. leads to deterioration of the vinyl chloride resin. The reaction temperature may be varied in the course of reaction. When the polymerization is carried out at lower temperature in particular, the reaction temperature may be raised in the latter half of the reaction time in order to decrease unreacted monomer.

Reaction time is determined by the type and amount of radical initiator used and the reaction temperature and is preferably adjusted to complete the grafting reaction in 1 to 15 hours.

The reaction vessel for use in graft copolymerization is preferably a stainless steel or glass lined autoclave equipped with a stirrer and jacket. The reaction vessel may also have a reflux condenser as auxiliary equipment for heat removal.

In the interior of the reaction vessel, the oxygen content of the atmosphere must be reduced to a level giving no adverse effect on the radical polymerization.

On conducting graft copolymerization, N-substituted maleimide, solvent monomer, radical initiator, suspension stabilizer, chain transfer agent, swelling agent and antioxidant may be charged, if necessary, all at once, by portions or continuously.

After completing graft copolymerization, unreacted monomer is removed by the usual procedure. The residual slurry is dehydrated and dried.

The graft copolymer obtained by the process of this invention can be subjected to usual processing method by formulating additives such as heat stabilizer, light stabilizer, lubricant, filler, colorant, impact resistance improver and heat resistance improver which are commonly used for the processing of vinyl chloride resin. Further, processing aid, flame retardant and smoke inhibitor which are generally formulated in vinyl chloride resin may also be added in a range giving no adverse effect on the object of this invention.

A broad range of known stabilizers can be applied to the processing of the heat resistant graft copolymer and the heat and impact resistant graft copolymer of this invention. However, stabilizers to be used are not limited to those known stabilizers.

Illustrative heat stabilizers include, for example, lead stabilizers such as white lead, tribasic lead sulfate, dibasic lead phosphite, dibasic lead phthalate, dibasic lead maleate, lead silicate and co-precipitated lead silicate with silica gel; metal soaps such as magnesium soap, calcium soap, barium soap, cadmium soap, zinc soap, lead soap and tin soap; liquid stabilizers such as cadmium-barium base, cadmium-barium-zinc base and barium-zinc base; organotin stabilizers such as alkyltin sulfide, aryltin sulfide, alkyltin oxide, aryltin oxide, organotin carboxylic acid and organotin mercaptide; epoxy stabilizers such as glycidyl ether and epoxy resin, epoxylated fats and oils, alkyl ester of epoxylated natural fatty acids and resin acids, and epoxy derivatives of cyclohexane; organic phosphites such as trialkyl phosphite, triphenyl phosphite and triallyl phosphite; polyhydric alcohols; and amine compounds.

Exemplary light stabilizers include, for example ultraviolet absorbers such as salicylate esters, benzoate esters, benzophenone derivatives, benzotriazole derivatives and acrylonitrile devivatives; ultra-violet stabilizers such as phosphorus compounds; and titanium oxide.

Suitable lubricants may be mentioned, for example, metal soaps such as magnesium stearate, calcium stearate, barium stearate, zinc stearate, and lead stearate; hydrocarbons such as liquid paraffin, natural paraffin, polyethylene wax, chlorinated hydrocarbon and fluorocarbon; fatty acids such as stearic acid, behenic acid, arachidic acid and oxy fatty acid; fatty acid amides such as fatty acid amide and alkylenebis fatty acid amide; fatty acid esters such as lower alcohol ester of fatty acid, polyglycol ester of fatty acid and aliphatic alcohol ester of fatty acid; polyhydric alcohol, polyglycol and polyglycerol; partial ester of polyhydric alcohol with fatty acid; partial ester of polyglycol with fatty acid; and partial ester of polyglycerol with fatty acid.

Illustrative fillers include, for example, calcium carbonate, clay, hydrated silicate, silica, calcium silicate, aluminum silicate, asbestos, antimony oxide, talc, trihydrated aluminum, hydated zinc borate, magnesia, sodium bicarbonate, potassium nitrate, calcium hydroxide, mica and synthetic fluoro mica.

Exemplary colorants may be mentioned, for example, organic pigments and inorganic pigments. Organic pigments include azopigments such as azo lake, insoluble azo pigments and condensation azo pigments; phthalocyanine pigments such as phthalocyanine blue and phthalocyanine green; vat dye pigments such as anthroquinone pigments, perylene pigments, thioindigo pigments and isoindoline pigments; dyeing lake pigments such as basis dye lake and acid dye lake; quinacrydone pigments and dioxadine pigments. Inorganic pigments include precipitated pigments such as chromate, molybdate, oxide and cyanide; precipitated and calcined pigments such as oxide pigments and sulfide pigments; calcined pigments such as oxide pigments, ultramarine blue and cobalt blue; metal powders and pearl pigment.

Illustrative impact resistance improvers include, for example, ethylene-vinyl acetate copolymer (EVA), ethylene-propylene copolymer (EPR), polybutadiene-acrylonitrile-styrene copolymer (ABS), polybutadiene-styrene-methyl methacrylate (MBS), polybutylacrylate, crosslinked acrylic rubber, styrene-butadiene copolymer (SBR) and acrylonitrile-butadiene copolymer (NBR).

Exemplary heat resistance improvers include, for example, acrylonitril-α-methylstyrene-butadiene copoymer and polymethyl methacrylate-acrylic ester copolymer.

The present invention will be understood more readily with reference to the following examples; however these examples are intended to illustrate the invention and are not to be construed to limit the scope of the invention.

In the following examples and comparative examples, below described additives were added to 100 parts by weight of the graft copolymer.

| Tribasic lead sulfate | 2 parts by weight |
|---|---|
| Dibasic lead stearate | 1 part by weight |
| Lead stearate | 1 part by weight |
| Stearic acid | 0.5 part by weight |
| Calcium stearate | 0.3 part by weight |

In these examples, copolymer and additives were mixed in a Henschel mixer and extruded with a 30 mmφ anisotropic twin-screw extruder to form a joint plate having a thickness of 3 mm and width of 40 mm. Properties were evaluated by the following methods.

(a) Vicat softening points was measured under 5 kgf load in accordance with JI K-7206.

(b) Thermal stability was indicated by the time required for generating black discoloration in a Geer's oven at 190° C.

(c) Processability was divided into the following four classes by observing the surface appearance of the joint plate.

⊙ Surface is smooth and no flash is found at the edge.

○ Surface is smooth and small flashes are found at the edge.

△ Surface is slightly rough and flashes are found at the edge.

✕ Surface is rough and large flashes are found.

The determination of antioxidant contained in polyvinyl chloride resin for use in graft copolymer was carried out by gas chromatography or liquid chromatography.

EXAMPLE 1

A stainless steel autoclave having an internal volume of 840 l and equipped with a stirrer and a jacket was charged with 100 kg of suspension polymerized polyvinyl chloride resin having a polymerization degree of 1050 and containing 10 ppm by weight of bisphenol A and 354 kg of deionized water. Separately, 10 kg of N-cyclohexyl-maleimide, 30 kg of methyl methacrylate and 0.40 kg of azobisisobutyronitrile were mixed. Weight ratio of these ingredients in the mixture was corresponded to 1 part by weight of azobisisobutyronitrile per 100 parts by weight of the sum of N-substituted maleimide and solvent monomer. The air in the interior of autoclave was evacuated with a vacuum pump and the mixture obtained was sucked into the autoclave.

Subsequently, the reaction was carried out at 80° C. for 6 hours. The reaction product was dehydrated and dried to obtain 117 kg of graft copolymer. The copolymer thus obtained was extruded to form a joint plate by the same procedures as described above and properties were evaluated. Results are illustrated in Table 1.

EXAMPLE 2

A stainless steel autoclave having an internal volume of 840 l and equipped with a stirrer and a jacket was charged with 100 kg of suspension polymerized polyvinyl chloride resin having a polymerization degree of 1050 and 354 kg of deionized water. Separately, 10 kg of N-cyclohexyl-maleimide, 30 kg of methyl methacrylate and 0.40 kg of azobisisobutyronitrile were mixed. The air in the interior of autoclave was evacuated with a vacuum pump and the mixture obtained was sucked into the autoclave.

Subsequently, the reaction was carried out at 80° C. for 6 hours. The reaction product was dehydrated and dried to obtain 117 kg of graft copolymer.

The copolymer thus obtained was extruded to form a joint plate by the same procedures as described above and properties were evaluated. Results are illustrated in Table 1.

EXAMPLE 3

The same procedures as described in Example 1 were carried out except that polyvinyl chloride resin containing 200 ppm by weight of Irganox 1076 (a product of Ciba Geigy Ltd.) was used in place of polyvinyl chloride resin containing 10 ppm by weight of bisphenol-A and 4 kg of azobisisobutyronitrile was used. The graft copolymer obtained was extruded to form a joint plate by the same procedures as described above. Results on evaluation are illustrated in Table 1.

COMPARATIVE EXAMPLE 1

A stainless steel autoclave having an internal volume of 840 l and equipped with a stirrer and a jacket was charged with 100 kg of suspension polymerized polyvinyl chloride resin having a polymerization degree of 1050 and containing 10 ppm by weight of bisphenol-A and 354 kg of deionized water. Separately, 8 kg of deionized water, 10 kg of N-cyclohexylmaleimide and 0.16 kg of azobisisobutyronitrile were mixed. The air in the interior of the autoclave was evacuated with a vacuum pump and the mixture obtained above was sucked into the autoclave. Stirring was started and the reaction was carried out at 80° C. for 6 hours. The reaction product was dehydrated and dried to obtain 107 kg of graft copolymer. The product was yellow colored. The copolymer thus obtained was tried to form a joint plate by the same procedures as described above. However, the copolymer generated ill-smell and caused eye irritation. Consequently, extruding operation was given up. Result are illustrated in Table 1.

COMPARATIVE EXAMPLE 2

Suspension polymerized polyvinyl chloride resin having a polymerization degree of 1050 and containing 10 ppm by weight of bisphenol A was subjected as such to extruding operation. Results on evaluation are illustrated in Table 1.

COMPARATIVE EXAMPLE 3

A stainless steel autoclave having an internal volume of 840 l and equipped with a stirrer and a jacket was charged with 310 kg of deionized water, 105 g of a 70% by weight solution of 2-ethyl-hexylperoxy dicarbonate and 5 kg of N-cyclohexylmaleimide. After evacuating the air in the interior of the autoclave with a vacuum pump, 8.4 kg of a 5% by weight aqueous solution of partially saponified polyvinyl alcohol having a saponification degree of 80 mole % and a polymerization degree of about 2000 and 120 kg of vinyl chloride monomer were added. The reaction was carried out at 57° C. A dispersion of 5 kg of N-cyclohexylmaleimide in 30 kg of a deionized water solution containing 30 g of the above partially saponified polyvinyl alcohol was charged into the autoclave after 2.5 hours with increased pressure. When the internal pressure of the autoclave was lowered to 6.5 kg/cm²G, unreacted monomer was recovered. The slurry was dehydrated and dried to obtain 110 kg of copolymer as white powder. Evaluation results conducted as in Example 1 are illustrated in Table 1.

REFERENCE EXAMPLE 1

A stainless steel autoclave having an internal volume of 840 l and equipped with a stirrer and a jacket was charged with 252 kg of deionized water, 12.5 kg of N-cyclohexylmaleimide, 25 g of partially saponified polyvinyl alcohol having a saponification degree of 80% by mole and a polymerization degree of about 2000 and 150 g of lauroyl peroxide were charged. After evacuating the air in the interior of the autoclave with a vacuum pump, 37.5 kg of methyl methacrylate were charged with stirring and polymerization was carried out at 80° C. for 6¼ hours. The resulting slurry was dehydrated and dried white powder obtained was 47.5 kg.

COMPARATIVE EXAMPLE 4

A blend of 100 kg of suspension polymerized polyvinyl chloride resin of Comparative Example 2 having a polymerization degree of 1050 and 40 kg of N-cyclohexylmaleimide/methyl methacrylate copolymer of Reference Example 1 was extruded to form a joint plate by the same procedures as described above. Results on evaluation are illustrated in Table 1.

COMPARATIVE EXAMPLE 5

The same procedures as described in Example 1 were carried out except that polyvinyl chloride resin containing 100 ppm by weight of bisphenol-A and 500 ppm by weight of Irganox 1076 (a product of Ciba Geigy Ltd.) was used in place of polyvinyl chloride resin containing 10 ppm by weight of bisphenol-A and 10 kg of azobisisobutyronitrile was used in place 0.40 kg of azobisisobutyronitrile.

The graft copolymer obtained was extruded to form a joint plate by the same procedures as described above. The copolymer generated ill-smell and caused eye irritation during extrusion. Results on evaluation are illustrated in Table 1.

EXAMPLES 4~17

Graft copolymers were prepared by carrying out the same procedures as described in Example 1 except that various N-substituted maleimides illustrated in Table 2 were used in place of N-cyclohexyl-maleimide. The copolymers obtained were extruded to form joint plates by the same procedures as described above. Results on evaluation are illustrated in Table 2.

EXAMPLE 18~21 AND COMPARATIVE EXAMPLE 6~7

The same procedures as described in Example 1 were carried out except that amounts of N-cyclohexyl-maleimide and methyl methacrylate were varied as illustrated in Table 3 and azobisisobutyronitrile was used in an amount of 1 part by weight per 100 parts by weight of the sum of N-cyclohexylmaleimide and methylmethacrylate. The graft copolymers obtained were extruded to form joint sheets by the same procedures as described above. Results on evaluation are illustrated in Table 3.

TABLE 1

| | Graft copolymer | | | | | | | | |
|---|---|---|---|---|---|---|---|---|---|
| | Polyvinyl chloride resin* | | N-Substituted maleimide | | Solvent monomer | | Vicat softening | Thermal | |
| Example No. | Antioxidant (ppm) | Amount (kg) | Compound | Amount (kg) | Compound | Amount (kg) | point (°C.) | stability (min) | Processability |
| Ex. 1 | Bisphenol-A (10) | 100 | N-Cyclohexyl maleimide | 10 | Methyl methacrylate | 30 | 96 | 240 | ⊙ |
| Ex. 2 | none | ↑ | ↑ | ↑ | ↑ | ↑ | 96 | 220 | ⊙ |
| Ex. 3 | Irganox 1076 (200) | ↑ | ↑ | ↑ | ↑ | ↑ | 95 | 250 | ○ |
| Comparat. Ex. 1 | Bisphenol-A (10) | ↑ | ↑ | ↑ | — | — | Extrusion impossible | | |
| Comparat. Ex. 2 | ↑ | ↑ | — | — | — | — | 84 | 180 | ⊙ |
| Comparat. Ex. 3 | Copolymer of vinyl chloride monomer and N-cyclohexyl maleimide. | | | | | | 90 | 60 | ⊙ |
| Comparat. Ex. 4 | Blend of polyvinyl chloride resin (Bisphenol-A, 10 ppm) and N-cyclohexyl maleimide/methyl methacrylate (10/30) copolymer | | | | | | 89 | 190 | X |
| Comparat. Ex. 5 | Bisphenol-A (100) Irganox 1076 (500) | 100 | N-Cyclohexyl maleimide | 10 | Methyl methacrylate | 30 | 92 | 170 | X |

*Suspension polymerization type, Polymerization degree 1050

TABLE 2

| | Graft copolymer | | | | | | | | |
|---|---|---|---|---|---|---|---|---|---|
| | Polyvinyl chloride resin* | | N-Substituted maleimide | | Solvent monomer | | Vicat softening | Thermal | |
| Example No. | Antioxidant (ppm) | Amount (kg) | Compound | Amount (kg) | Compound | Amount (kg) | point (°C.) | stability (min) | Processability |
| Ex. 4 | Bisphenol-A (10) | 100 | N-Methyl maleimide | 10 | Methyl methacrylate | 30 | 95 | 240 | ⊙ |

TABLE 2-continued

| Example No. | Polyvinyl chloride resin* Antioxidant (ppm) | Polyvinyl chloride resin* Amount (kg) | N-Substituted maleimide Compound | N-Substituted maleimide Amount (kg) | Solvent monomer Compound | Solvent monomer Amount (kg) | Vicat softening point (°C.) | Thermal stability (min) | Processability |
|---|---|---|---|---|---|---|---|---|---|
| Ex. 5  | ↑ | ↑ | N-Isopropyl maleimide | ↑ | ↑ | ↑ | 94 | ↑ | ○ |
| Ex. 6  | ↑ | ↑ | N-t-Butyl Maleimide | ↑ | ↑ | ↑ | 96 | ↑ | ⊚ |
| Ex. 7  | ↑ | ↑ | N-Hexyl maleimide | ↑ | ↑ | ↑ | 94 | ↑ | ○ |
| Ex. 8  | ↑ | ↑ | N-Lauryl maleimide | ↑ | ↑ | ↑ | 94 | ↑ | ○ |
| Ex. 9  | ↑ | ↑ | N-Bicyclo-(2,2,2)-heptyl-2-methylmaleimide | ↑ | ↑ | ↑ | 96 | ↑ | ○ |
| Ex. 10 | ↑ | ↑ | N-Phenyl maleimide | ↑ | ↑ | ↑ | ↑ | ↑ | ⊚ |
| Ex. 11 | ↑ | ↑ | N-Hydroxyphenyl maleimide | ↑ | ↑ | ↑ | ↑ | ↑ | ○ |
| Ex. 12 | ↑ | ↑ | N-Methoxyphenyl maleimide | ↑ | ↑ | ↑ | ↑ | ↑ | ○ |
| Ex. 13 | ↑ | ↑ | N-Chlorophenyl maleimide | ↑ | ↑ | ↑ | ↑ | ↑ | ⊚ |
| Ex. 14 | ↑ | ↑ | N-Carboxyphenyl maleimide | ↑ | ↑ | ↑ | ↑ | ↑ | ○ |
| Ex. 15 | ↑ | ↑ | N-Nitrophenyl maleimide | ↑ | ↑ | ↑ | ↑ | ↑ | ○ |
| Ex. 16 | ↑ | ↑ | N-Methylphenyl maleimide | ↑ | ↑ | ↑ | ↑ | ↑ | ○ |
| Ex. 17 | ↑ | ↑ | N-Triphenylmethyl benzylmaleimide | ↑ | ↑ | ↑ | ↑ | ↑ | ○ |

*Suspension polymerization type, Polymerization degree 1050

TABLE 3

| Example No. | Polyvinyl chloride resin* Antioxidant (ppm) | Polyvinyl chloride resin* Amount (kg) | N-Substituted maleimide Compound | N-Substituted maleimide Amount (kg) | Solvent monomer Compound | Solvent monomer Amount (kg) | Vicat softening point (°C.) | Thermal stability (min) | Processability |
|---|---|---|---|---|---|---|---|---|---|
| Ex. 18 | Bisphenol-A (10) | 100 | N-Cyclohexyl maleimide | 2 | Methyl methacrylate | 6 | 86 | 210 | ⊚ |
| Ex. 19 | ↑ | ↑ | ↑ | 5 | ↑ | 15 | 90 | 220 | ⊚ |
| Ex. 20 | ↑ | ↑ | ↑ | 30 | ↑ | 90 | 110 | 280 | ○ |
| Ex. 21 | ↑ | ↑ | ↑ | 60 | ↑ | 180 | 121 | 300 | Δ |
| Comparat. Ex. 6 | ↑ | ↑ | ↑ | 0.5 | ↑ | 1.5 | 84 | 200 | ⊚ |
| Comparat. Ex. 7 | ↑ | ↑ | ↑ | 150 | ↑ | 450 | 131 | 310 | X |

*Suspension polymerization type, Polymerization degree 1050

EXAMPLE 22~23 AND COMPARATIVE EXAMPLE 8

The same procedures as described in Example 1 were carried out except that solvent monomers illustrated in Table 4 were used in place of methyl methacrylate. The graft copolymers obtained were extruded by the same procedures as described above. Results on evaluation are illustrated in Table 4.

EXAMPLE 24~27 AND COMPARATIVE EXAMPLE 9~10

The same procedures as described in Example 1 were carried Out except that amount of the solvent monomer was varied as illustrated in Table 4 and azobisisobutyronitrile was used in an amount of 1 part by weight per 100 parts by weight of the sum of N-cyclohexylmaleimide and methyl methacrylate. The graft copolymers obtained were extruded by the same procedures as described above. Results on evaluation are illustrated in Table 4.

TABLE 4

| Example No. | Polyvinyl chloride resin* Antioxidant (ppm) | Polyvinyl chloride resin* Amount (kg) | N-Substituted maleimide Compound | N-Substituted maleimide Amount (kg) | Solvent monomer Compound | Solvent monomer Amount (kg) | Vicat softening point (°C.) | Thermal stability (min) | Processability |
|---|---|---|---|---|---|---|---|---|---|
| Ex. 22 | Bisphenol-A (10) | 100 | N-Cyclohexyl maleimide | 10 | Styrene | 30 | 94 | 240 | ⊚ |
| Ex. 23 | ↑ | ↑ | ↑ | ↑ | t-Butyl methacrylate | 30 | 95 | 240 | ⊚ |
| Comparat. Ex. 8 | ↑ | ↑ | ↑ | ↑ | 2-Ethylhexyl acrylate | 30 | 49 | 240 | ○ |
| Ex. 24 | ↑ | ↑ | ↑ | ↑ | Methyl methacrylate | 2 | 90 | 210 | Δ |
| Ex. 25 | ↑ | ↑ | ↑ | ↑ | ↑ | 5 | 91 | 220 | ○ |
| Ex. 26 | ↑ | ↑ | ↑ | ↑ | ↑ | 10 | 92 | 230 | ⊚ |

TABLE 4-continued

| | Graft copolymer | | | | | | | | |
|---|---|---|---|---|---|---|---|---|---|
| | Polyvinyl chloride resin* | | N-Substituted maleimide | | Solvent monomer | | Vicat softening | Thermal | |
| Example No. | Antioxidant (ppm) | Amount (kg) | Compound | Amount (kg) | Compound | Amount (kg) | point (°C.) | stability (min) | Processability |
| Ex. 27 | ↑ | ↑ | ↑ | ↑ | ↑ | 40 | 96 | 260 | ◯ |
| Comparat. Ex. 9 | ↑ | ↑ | ↑ | ↑ | ↑ | 0.3 | Extrusion impossible | | |
| Comparat. Ex. 10 | ↑ | ↑ | ↑ | ↑ | ↑ | 80 | 100 | 280 | △ |

*Suspension polymerization type, Polymerization degree 1050

REFERENCE EXAMPLE 2

Preparation Example of crosslinked acrylic rubber

A 5 m³ stainless steel autoclave equipped with a stirrer and a jacket were charged with 2000 kg of deionized water, 7.0 kg of anionic emulsifier, 0.67 kg of ammonium per-sulphate, 700 kg of n-butyl methacrylate and 31 kg of 1,3-butylene glycol diacrylate. After replacing the air with nitrogen in the interior of the autoclave, polymerization was carried out at 60° C. Rapid increase in the reaction temperature was initiated after 16 hours from the start of the reaction, and water was passed through the jacket to remove generated heat. The polymerization was terminated after conducting for further 10 hours at the same temperature. The latex thus obtained had a concentration of 25% by weight and an average particle size of 0.07 μm.

REFERENCE EXAMPLE 3

Preparation Example of rubber containing graft copolymer

A stainless steel autoclave having an internal volume of 7 m³ and equipped with a stirrer and a jacket was charged with 2700 kg of deionized water, 1.5 kg of partially saponified polyvinyl alcohol having a saponification degree of 80% by mole and a polymerization degree of about 2000, 1.4 kg of methyl cellulose and 0.17 kg of 2,2'-azobisisobutyronitrile and 0.29 kg of 2,2'-azobis-2,4-dimethylvaleronitrile. After evacuating the air in the interior of the autoclave with a vacuum pump, 368 kg (92 kg as solid ingredient) of the acrylic latex having a concentration of 25% by weight which was obtained in Reference Example 2 was charged with stirring, coagulated and successively 1400 kg of vinyl chloride was charged to carry out polymerization at 57° C. The internal pressure of the autoclave decreased to 6.5 kg/cm²G with the progress of polymerization. Then 25 g of bisphenol-A was added to terminate polymerization. After removing unreacted vinylchloride, the resulting slurry was dehydrated and dried. White powder obtained was 1282 kg and contained 7.2% by weight of rubber ingredient on the basis of chlorine analysis.

REFERENCE EXAMPLE 4

Polymerization reaction was carried out by the same procedures as described in Reference Example 3 except that, after charging the deionized water, 92 kg of EVA containing 45% by weight of vinyl acetate was added in place of 368 kg (92 kg as solid ingredient) of the acrylic latex. White powder obtained was 1280 kg and contained 7.2% by weight of rubber ingredient on the basis of chlorine analysis.

EXAMPLE 28

A graft copolymer was prepared by carrying out the same procedures as described in Example 1 except that the polyvinyl chloride resin obtained in Reference Example 3 was used in place of the suspension polymerized polyvinyl chloride resin containing 10 ppm by weight of bisphenol-A and having a polymerization degree of 1050.

A joint plate was extruded from the graft copolymer by the same procedures as described above. Results on evaluation are illustrated in Table 5. Sharpy impact strength was measured by using a hammer having a moment of 60 kgf-cm in accordance with JIS K-6754.

EXAMPLE 29

A graft copolymer was prepared by carrying out the same procedures as described in Example 1 except that the polyvinyl chloride resin obtained in Reference Example 4 was used in place of the suspension polymerized polyvinyl chloride resin containing 10 ppm by weight of bisphenol-A.

A joint plate was extruded from the graft copolymer by the same procedures as described above. Results on evaluation are illustrated in Table 5.

REFERENCE EXAMPLE 5

After carrying out the same procedures as described in Reference Example 3, the polymerization reaction was terminated by the addition of 125 g of bisphenol-A and 650 g of Irganox 1076 in place of 25 g of bisphenol-A. White powder obtained was 1283 kg and contained 7.2% by weight of rubber ingredient on the basis of chlorine analysis.

COMPARATIVE EXAMPLE 11

A graft copolymer was prepared by carrying out the same procedures as described in Example 1 except that the polyvinyl chloride resin obtained in Reference Example 5 was used in place of polyvinyl chloride resin containing 10 ppm by weight of bisphenol-A and 10 kg of azobisisobutyronitrile was used in place of 0.40 kg of azobisisobutyronitrile.

A joint plate was extruded from the graft copolymer by the same procedures as described above. The graft copolymer generated ill-smell and caused eye irritation in the extrusion operation. Results on evaluation are illustrated in Table 5.

TABLE 5

| Example No. | Vicat softening point (°C.) | Thermal stability (min) | Processability | Sharpy impact strength (kgf cm/cm²) |
|---|---|---|---|---|
| Ex. 1 | 96 | 240 | ⓒ | 5 |
| Ex. 22 | 94 | 240 | ⓒ | 4 |

TABLE 5-continued

| Example No. | Vicat softening point (°C.) | Thermal stability (min) | Process-ability | Sharpy impact strength (kgf cm/cm²) |
|---|---|---|---|---|
| Ex. 28 | 94 | 240 | ⊚ | 19 |
| Ex. 29 | 94 | 240 | ⊚ | 14 |
| Comparat. Ex. 11 | 89 | 170 | X | 6 |

What is claimed is:

1. A process for the preparation of a heat resistant polyvinyl chloride copolymer by graft copolymerization of a N-substituted maleimide on a vinyl chloride resin which comprises conducting said graft polymerization in the presence of a radical polymerizable monomer which is:
   (1) liquid at the polymerization temperature,
   (2) capable of dissolving the N-substituted maleimide at the polymerization temperature,
   (3) such that the homopolymer of the monomer has a glass transition temperature of at least 70° C., and
   (4) used in an amount sufficient to dissolve the N-substituted maleimide wherein the amount of the N-substituted maleimide is from 1 to 100 parts by weight per 100 parts by weight of the vinyl chloride resin and the amount of the radical polymerizable monomer is from 40 to 700 parts by weight per 100 parts by weight of N-substituted maleimide.

2. The process of claim 1 wherein the vinyl chloride resin is a homopolymer of vinyl chloride.

3. The process of claim 1 wherein the vinyl chloride resin contains an antioxidant in an amount of 5 to 500 ppm by weight.

4. The process of claim 1 wherein the antioxidant is added in the graft copolymerization in an amount of 5 to 500 ppm by weight per the vinyl chloride resin.

5. The process of claim 1 wherein the N-substituted maleimide is used in an amount of 1 to 100 parts by weight per 100 parts by weight of the vinyl chloride resin.

6. The process of claim 1 wherein the N-substituted maleimide is selected from the group consisting of N-t-butylmaleimide, N-cyclohexylmaleimide, N-phenylmaleimide and N-(o,m or p)-chlorophenylmaleimide.

7. The process of claim 1 wherein the radical polymerizable monomer is selected from the group consisting of methyl methacrylate, t-butyl methacrylate, phenyl methacrylate, styrene, α-methylstyrene, acrylonitrile and methacrylonitrile.

8. The process of claim 1 wherein the graft copolymerization is conducted by a radical polymerization method.

9. The process of claim 8 wherein the radical copolymerization method is a suspension polymerization method or a bulk polymerization.

10. The process of claim 8 wherein the graft copolymerization is conducted by an aqueous suspension polymerization method.

11. A heat resistant polyvinyl chloride copolymer obtained by the process of claim 1.

12. A process for the preparation of heat and impact resistant polyvinyl chloride copolymer by graft copolymerization of a N-substituted maleimide on a vinyl chloride resin which comprises conducting said graft copolymerization:
   (a) by using a rubber containing polyvinyl chloride copolymer as a vinyl chloride resin, and
   (b) in the presence of a radical polymerizable monomer which is:
      (1) liquid at the polymerization temperature,
      (2) capable of dissolving the N-substituted maleimide at the polymerization temperature,
      (3) such that the homopolymer of the monomer has a glass transition temperature of at least 70° C., and
      (4) used in an amount sufficient to dissolve the N-substituted maleimide wherein the amount of the N-substituted maleimide is from 1 to 100 parts by weight per 100 parts by weight of the vinyl chloride resin and the amount of the radical polymerizable monomer is from 40 to 700 parts by weight per 100 parts by weight of said N-substituted maleimide.

13. The process of claim 12 wherein rubber content of the rubber containing polyvinyl chloride copolymer is from 0.5 to 10% by weight.

14. The process of claim 12 wherein the rubber containing polyvinyl chloride copolymer contains an antioxidant in an amount of 5 to 500 ppm by weight.

15. The process of claim 12 wherein the antioxidant is added in the graft copolymerization in an amount of 5 to 500 ppm by weight per the vinyl chloride resin.

16. The process of claim 12 wherein the N-substituted maleimide is used in an amount of 1 to 100 parts by weight per 100 parts by weight of vinyl chloride resin.

17. The process of claim 12 wherein the N-substituted maleimide is selected from the group consisting of N-t-butylmaleimide, N-cyclohexylmaleimide, N-phenylmaleimide and N-(o,m or p)-chlorophenylmaleimide 18. The process of claim 12 wherein the radical polymerizable monomer is is selected from the group consisting of methyl methacrylate, t-butyl methacrylate, phenyl methacrylate, α-methylstyrene, styrene, acrylonitrile and methacrylonitrile.

19. The process of claim 12 wherein the graft copolymerization is conducted by a radical polymerization method.

20. The process of claim 19 wherein the radical copolymerization method is a suspension polymerization method or a bulk polymerization method.

21. The process of claim 19 wherein the radical copolymerization method is an aqueous suspension polymerization.

22. A heat and impact resistant polyvinyl chloride copolymer obtained by the process of claim 12.

* * * * *